(12) United States Patent
Den Boer et al.

(10) Patent No.: US 8,781,806 B2
(45) Date of Patent: Jul. 15, 2014

(54) DETERMINING ELASTIC AND FLUID FLOW PROPERTIES OF A FRACTURED RESERVOIR

(75) Inventors: Lennert David Den Boer, Calgary (CA); Colin Michael Sayers, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 636 days.

(21) Appl. No.: 12/755,546

(22) Filed: Apr. 7, 2010

(65) Prior Publication Data

US 2011/0087472 A1    Apr. 14, 2011

Related U.S. Application Data

(60) Provisional application No. 61/174,126, filed on Apr. 30, 2009.

(51) Int. Cl.
*G06G 7/48* (2006.01)

(52) U.S. Cl.
USPC .......................................... 703/10; 345/424

(58) Field of Classification Search
CPC .................................................... E21B 49/00
USPC ................................ 703/5, 6, 7, 10; 345/424
See application file for complete search history.

(56) References Cited

U.S. PATENT DOCUMENTS

| | | |
|---|---|---|
| 5,508,973 A | 4/1996 | Mallick et al. |
| 6,064,944 A * | 5/2000 | Sarda et al. ...................... 702/11 |
| 2002/0016702 A1 * | 2/2002 | Manceau et al. ................. 703/10 |
| 2003/0216898 A1 * | 11/2003 | Basquet et al. .................. 703/10 |
| 2009/0164189 A1 * | 6/2009 | Bourbiaux ....................... 703/10 |

OTHER PUBLICATIONS

Schoenberg, M., Protazio, J., "Zoeppritz Rationalized and Generalized to Anisotropy", Journal of Seismic Exploration 1, 125-144 (1992).
Kachanov, M. "Continuum Model fo Medium with Cracks", Journal of the Engineering Mechanics Division of the American Society of Civil Engineers, 106 No. EMS5, 1039-1051, (1980).
CIPO Exam Report to Canadian Patent Application No. 2,701,859 dated Mar. 28, 2012, 2 pages.
Examination Report issued for Mexican Patent Application No. MX/a/2010/004092, dated Jun. 10, 2013, 8 pages.

(Continued)

*Primary Examiner* — Kamini S Shah
*Assistant Examiner* — Luke Osborne (57) ABSTRACT

A technique includes identifying a fracture polygon intersecting a voxel of a three-dimensional grid of voxels representing a region of interest of a hydrocarbon-bearing reservoir based on data indicative of a discrete fracture network. The technique includes partitioning the polygon with a regular mesh of points and determining a number of the mesh points inside the voxel and inside the polygon. The technique includes estimating an area of the fracture inside the voxel based at least in part on the determined number of mesh points inside the voxel and inside the polygon. The technique includes determining at least one property of a portion of the hydrocarbon-bearing reservoir, which coincides with the voxel based at least in part on the estimated area of the fracture.

21 Claims, 10 Drawing Sheets

(56) References Cited

OTHER PUBLICATIONS

Gillespie et al., "Measurement and characterisation of spatial distributions of fractures," Tectonophysics, 1993, vol. 226: pp. 113-141.

Lynn et al., "SPE 29595: Natural Fracture Characterization Using P-Wave Reflection Seismic Data, VSP, Borehole Imaging Logs, and the In-Situ Stress Field Determination," SPE International, 1995: pp. 1-14.

Sayers et al., A Simple Technique for Finding Effective Elastic Constants of Cracked Solids for Arbitrary Crack Orientation Statistics, Int. J. solids Structures, 1991, vol. 27(6): pp. 671-680.

Sayers et al., "Microcrack-induced elastic wave anisotropy of brittle rocks," Journal of Geophysical Research, Mar. 1995, vol. 100(B3): pp. 4149-4156.

Sayers et al., "Azimuthal variation in AVO response for fractured gas sands," Geophysical Prospecting, 1997: pp. 165-182.

* cited by examiner

DETERMINING ELASTIC AND FLUID FLOW PROPERTIES OF A FRACTURED RESERVOIR

This application claims the benefit under 35 U.S.C. §119 (e) to U.S. Provisional Patent Application Ser. No. 61/174,126, entitled, "METHOD FOR CALCULATION OF ELASTIC AND FLUID FLOW PROPERTIES OF A FRACTURED RESERVOIR," which was filed on Apr. 30, 2009, and is hereby incorporated by reference in its entirety.

BACKGROUND

The invention generally relates to determining elastic and fluid flow properties of a fractured reservoir.

Natural fractures in reservoirs play an important role in determining fluid flow during production, and hence, knowledge of the orientation and density of fractures typically is vital in order to optimize production from naturally fractured reservoirs. Areas of high fracture density can represent "sweet spots" of high permeability, and it is typically important to be able to target such locations for infill drilling. The fractures with the largest apertures at depth tend to be oriented along the direction of the maximum in-situ horizontal stress and may therefore lead to significant permeability anisotropy in the reservoir. This will lead to an anisotropic permeability tensor, and it typically is important for optimum drainage that the separation of producers should be more closely spaced along the direction of minimum permeability than along the direction of maximum permeability.

Because oriented sets of fractures also lead to direction-dependent seismic velocities, information obtained in a seismic survey may be used to determine the orientations of fractures. Reflection amplitudes offer advantages over the use of seismic velocities for characterizing fractured reservoirs since they have higher vertical resolution and are more sensitive to the properties of the reservoir. However, the interpretation of variations in reflection amplitudes requires a model that allows the measured change in reflection amplitude to be inverted for the characteristics of the fractured reservoir.

Conventionally, models that are used to describe the seismic responses of fractured reservoirs have made simplified assumptions that prevent fractured reservoirs from being characterized correctly. In this manner, conventional models typically assume a single set of perfectly aligned fractures. However, most reservoirs contain several fractures sets with variable orientations within a given fracture set.

The use of a model that assumes a single set of fractures may therefore give misleading results. For example, for a vertically fractured reservoir containing a large number of fractures with normals being isotropically distributed in the horizontal plane, there is little or no variation in the reflection coefficients with azimuth. Therefore, an interpretation of the reflection amplitude versus azimuth curve based on the single set of aligned fractures assumption would predict incorrectly that the fracture density is zero.

Thus, there is a continuing need for a better way to model the seismic response of a fractured reservoir.

SUMMARY

In an embodiment of the invention, a technique includes identifying a fracture polygon intersecting a voxel of a three-dimensional grid of voxels representing a region of interest of a hydrocarbon-bearing reservoir based on data indicative of a discrete fracture network. The technique includes partitioning the polygon with a regular mesh of points and determining a number of the mesh points inside the voxel and inside the polygon. The technique includes estimating an area of the fracture inside the voxel based at least in part on the determined number of mesh points inside the voxel and inside the polygon. The technique includes determining at least one property of a portion of the reservoir, which coincides with the voxel based at least in part on the estimated area of the fracture.

Advantages and other features of the invention will become apparent from the following drawing, description and claims.

DETAILED DESCRIPTION

In accordance with embodiments of the invention that are described herein, a seismic response of a fractured, hydrocarbon bearing reservoir is modeled using information that is contained in a discrete fracture network (DFN). More specifically, as described below, a computationally efficient method is described for determining the elastic and fluid flow properties of the reservoir using a DFN. These computations involve determining second rank and fourth rank fracture compliance tensors (called "$\alpha_{ij}$" and "$\beta_{ijkl}$," respectively) which are used to compute the elastic and seismic properties and a hydraulic transmissivity tensor (called "$\gamma_{ij}$") that is used to compute the permeability tensor (called "$k_{ij}$") of the fractured reservoir. The variation in these tensors as a function of position in the reservoir may be used as a predictor of the variation in fracture density and permeability of the fracture network and allow seismic data to be used as a constraint on the fluid flow properties of the reservoir. Therefore, these tensors may be used to select the optimum location of infill wells in the field and to estimate the anisotropy of the permeability tensor. The estimated anisotropy of the permeability tensor can be used to determine the optimum orientation of deviated wells and a relative orientation of neighboring infill wells to ensure optimal drainage.

Figure 1:
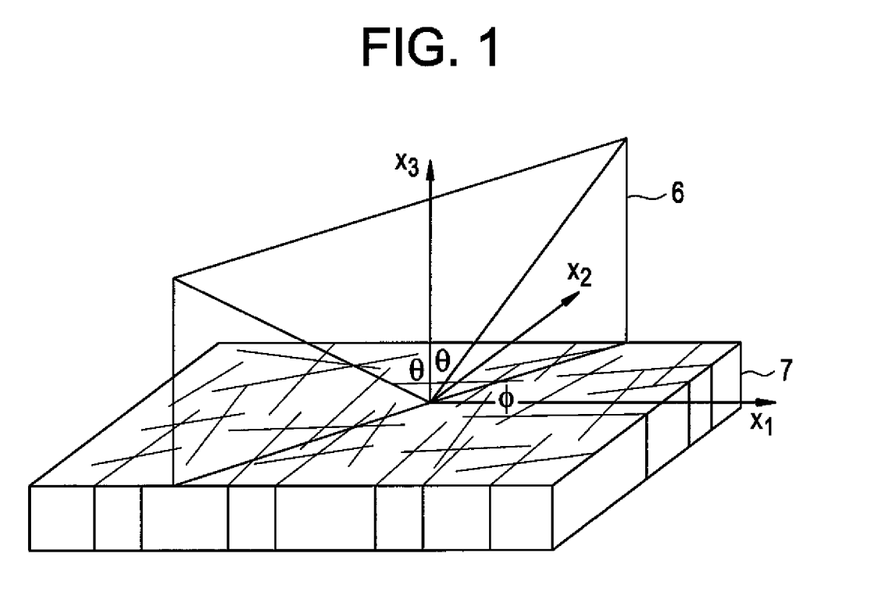
FIG. 1 is a schematic diagram illustrating the reflection of a seismic compression wave from a vertically fractured reservoir.

FIG. 1 schematically illustrates the reflection of a seismic compression wave, or P-wave, from a vertically fractured reservoir layer 7. The wave reflects in a plane 6, has an angle of incidence θ and has an azimuth φ. For this illustration, the axes $x_1$, $x_2$ and $x_3$ are chosen such that the $x_3$ axis is normal to the fractured layer 7. In the region of the reflection point, the fractured layer 7 is treated as an effective medium with an elastic stiffness tensor (called "$c_{ijkl}$") and a compliance tensor (called "$s_{ijkl}$"). These tensors vary laterally over the reservoir due to a lateral variation in fracture density.

In the absence of fractures the elastic stiffness tensor and elastic compliance tensor of the reservoir rock may be denoted by $c_{ijkl}^0$ and $s_{ijkl}^0$, respectively. The elastic compliance $s_{ijkl}$ of a fractured reservoir may be described as follows:

$$s_{ijkl} = s_{ijkl}^0 + \Delta s_{ijkl}, \quad \text{Eq. 1}$$

where the excess compliance (called "$\Delta s_{ijkl}$" in Eq. 1) due to the presence of the fractures may be expressed as follows:

$$\Delta s_{ijkl} = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl}. \quad \text{Eq. 2}$$

The $\alpha_{ij}$ and $\beta_{ijkl}$ tensors may be defined as follows:

$$\alpha_{ij} = \frac{1}{V}\sum_r B_T^{(r)} n_i^{(r)} n_j^{(r)} A^{(r)}, \text{ and} \quad \text{Eq. 3}$$

$$\beta_{ijkl} = \frac{1}{V}(B_N^{(r)} - B_T^{(r)}) n_i^{(r)} n_j^{(r)} n_k^{(r)} n_l^{(r)} A^{(r)}. \quad \text{Eq. 4}$$

In Eqs. 3 and 4, "$B_N^{(r)}$" and "$B_T^{(r)}$" represent the normal and shear compliances, respectively, of the rth fracture in a cube that has a volume V; "$n_i^{(r)}$" represents the ith component of the normal to the fracture; and "$A^{(r)}$" represents the area of the fracture. The tangential compliance $B_T$ is assumed to be independent of the direction of the shear traction that occurs within the plane of the contact. It is noted from Eqs. 3 and 4 that $\alpha_{ij}$ and $\beta_{ijkl}$ are symmetric with respect to all rearrangements of the indices so that, $\beta_{1122} = \beta_{1212}$, $\beta_{1133} = \beta_{1313}$, etc.

The elastic stiffness tensor of the fractured medium may be determined by inverting the compliance tensor given by Eq. 1. This allows the reflection coefficient to be computed for arbitrary fracture density and contrast across the interface using, for example, the method that is described in Schoenberg, M., and J. Protazio, *Zoeppritz Rationalized and Generalized to Anisotropy*, Journal of Seismic Exploration 1, 125-144 (1992).

A similar approach may be used to calculate the permeability tensor (called "$k_{ij}$") of a fractured reservoir given a DFN. More specifically, a second-rank hydraulic transmissivity tensor (called "$\gamma_{ij}$") may be defined as follows:

$$\gamma_{ij} = \frac{1}{V}\sum g^{(r)} n_i^{(r)} n_j^{(r)} A^{(r)}, \quad \text{Eq. 5}$$

where "$g^{(r)}$" represents the hydraulic conductivity of the rth fracture in volume V and "$A^{(r)}$" represents the area of the fracture. As set forth in Kachanov, M., *Continuum Model of Medium with Cracks*, Journal of the Engineering Mechanics Division of the American Society of Civil Engineers, 106, no. EMS5, 1039-1051 (1980), the permeability tensor in the presence of fractures may be written as follows:

$$k = k(\gamma). \quad \text{Eq. 6}$$

Using "$k_0$" (note bold here denotes a tensor) to denote the permeability tensor in the absence of fractures, the contribution of fractures to the permeability is given by $k - k_0$.

In the absence of fractures, the permeability of the reservoir rock may be assumed to be isotropic, with permeability tensor, as set forth in Kachanov (1980), as described below:

$$k = k_0 I, \quad \text{Eq. 7}$$

where "I" represents the unit tensor, and "$k_0$" is an isotropic function. If both the gradient in pressure and the fractures undergo any orthogonal transformation, then the flow undergoes the same orthogonal transformation. The Cayley-Hamilton theorem then implies that $k - k_0 I$ is a polynomial quadratic in $\gamma_{ij}$ with coefficients that are functions of the invariants of $\gamma_{ij}$. Linearizing in $\gamma_{ij}$ and using the fact that a set of parallel fractures does not affect the flow perpendicular to the fractures allows $k - k_0 I$ to be determined as a function of $\gamma_{ij}$, as described below:

$$k - k_0 I = C[tr(\gamma)I - \gamma]. \quad \text{Eq. 8}$$

Described below is a system and technique for determining the tensors $\alpha_{ij}$, $\beta_{ijkl}$ and $\gamma_{ij}$ from the information that is contained in a Discrete Fracture Network (DFN). The technique includes discretizing a region of interest of a hydrocarbon-bearing formation as a three-dimensional (3-D) Cartesian grid and efficiently determining the normal and area of each fracture in each cell, or cube, such that the $\alpha_{ij}$, $\beta_{ijkl}$ and $\gamma_{ij}$ tensors for each cube may be determined.

Figure 2:
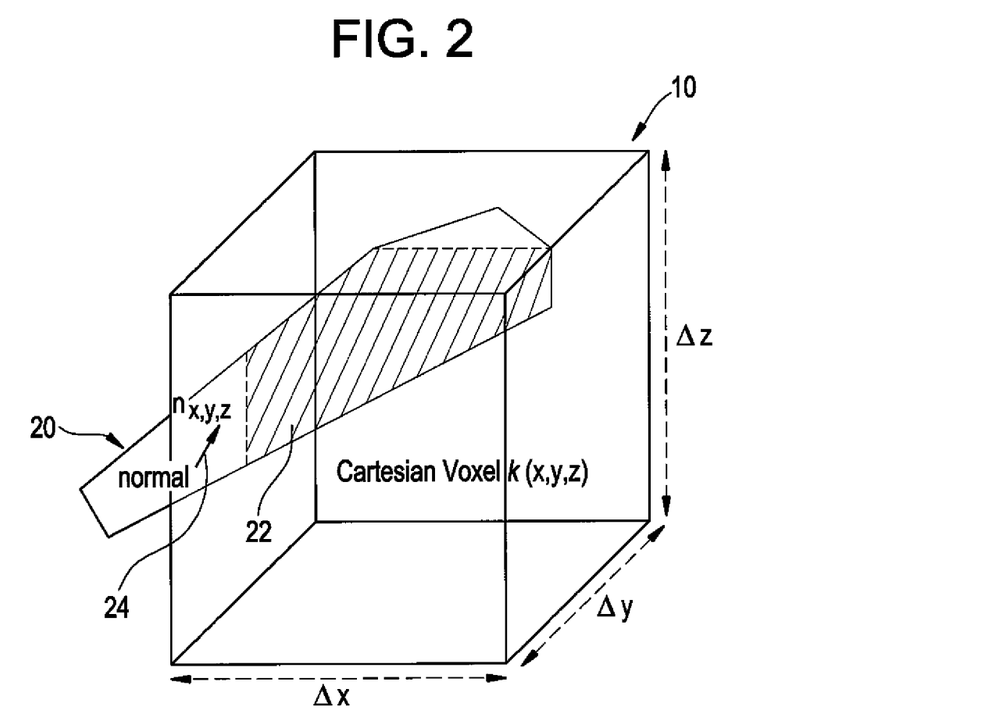
FIG. 2 is a perspective view illustrating the intersection of a fracture polygon with a voxel according to an embodiment of the invention.

Each cube is further discretized by volumetric pixels, or voxels, and an exemplary voxel 10 is depicted in FIG. 2. As depicted in FIG. 2, the voxel 10 is defined by dimensions Δx, Δy and Δz. For the example that is described below, a fracture polygon 20 intersects the voxel 10, and as depicted in FIG. 2, the polygon 20 has an associated normal $n_{x,y,z}$ 24. The fracture polygon 20 is provided by the DFN. The problem is to efficiently determine a fracture area for the cube (i.e., the area of the polygon 20 inside the cube), and this process involves, for each voxel 10 of the cube, which the polygon intersects, determining an area 22 of the polygon 20, which is partially or wholly inside the voxel 10. By determining the fracture areas inside the voxels 10, the fracture areas inside the cube may be determined, as further described below in connection with FIGS. 8A and 8B.

It is noted that the solutions that are disclosed herein are for any arbitrary planar polygon 20 that extends into 3-D space and is not limited to the specific six sided polygon that is depicted in FIG. 2.

Figure 4:
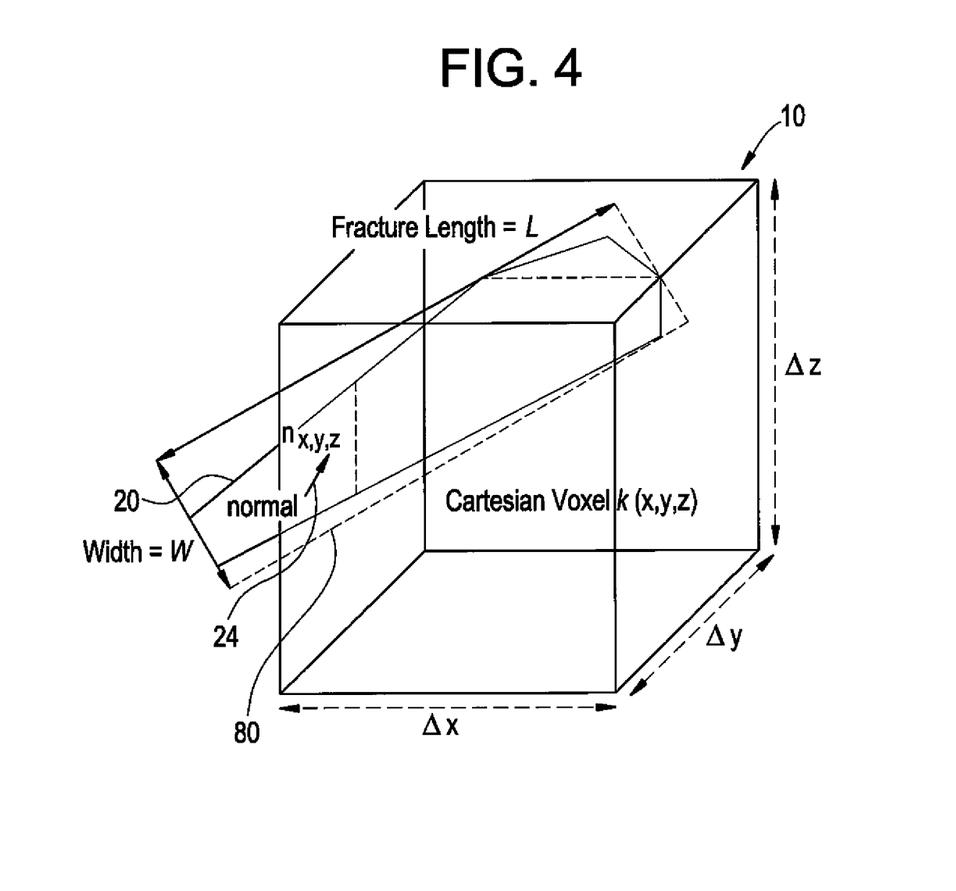
FIG. 4 is a perspective view illustrating a minimum bounding rectangle for the fracture polygon according to an embodiment of the invention.

For purposes of determining the area of the polygon 20 inside the voxel 10, the polygon 20 is first conceptually surrounded by a minimum bounding rectangle 80, which is depicted in FIG. 4. The minimum bounding rectangle of a convex polygon coincides with at least one polygon side, as illustrated in FIG. 4. The minimum bounding rectangle has a length of "L," which is the fracture length and a width of "W."

Figure 5:
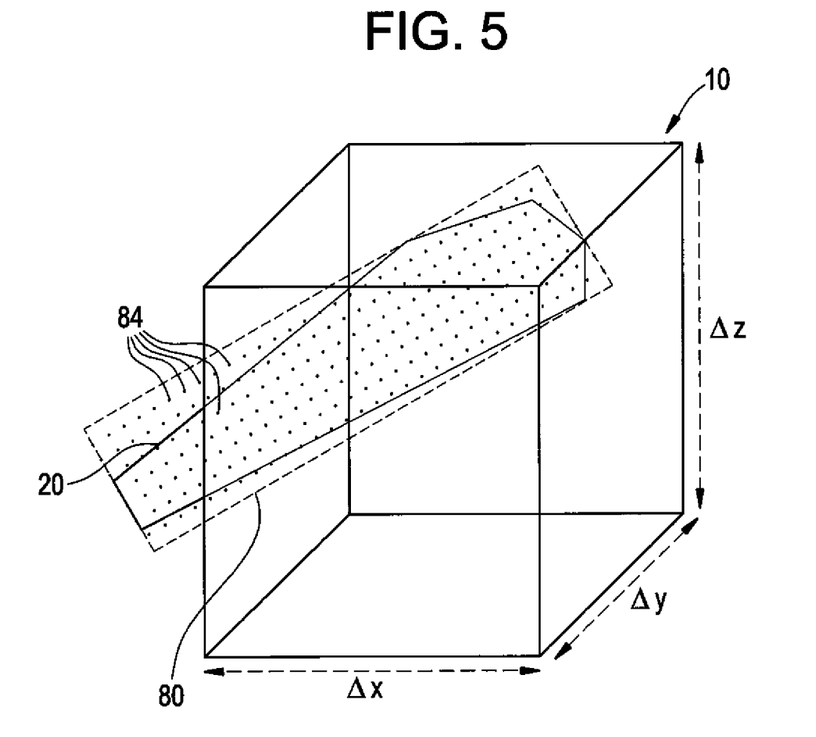
FIG. 5 is a perspective view illustrating the partitioning of the minimum bounding rectangle with a regular mesh of points according to an embodiment of the invention.

The minimum bounding rectangle 80 is partitioned into a regular mesh of $n_L \times n_W$ points 84, as depicted in FIG. 5. Thus, some of the points 84 are located outside of the polygon 20, some of the points 84 are disposed inside the polygon 20, some of the points are disposed inside the voxel 10 and some of the points 84 are disposed outside the voxel 10 for this example.

Figure 6:
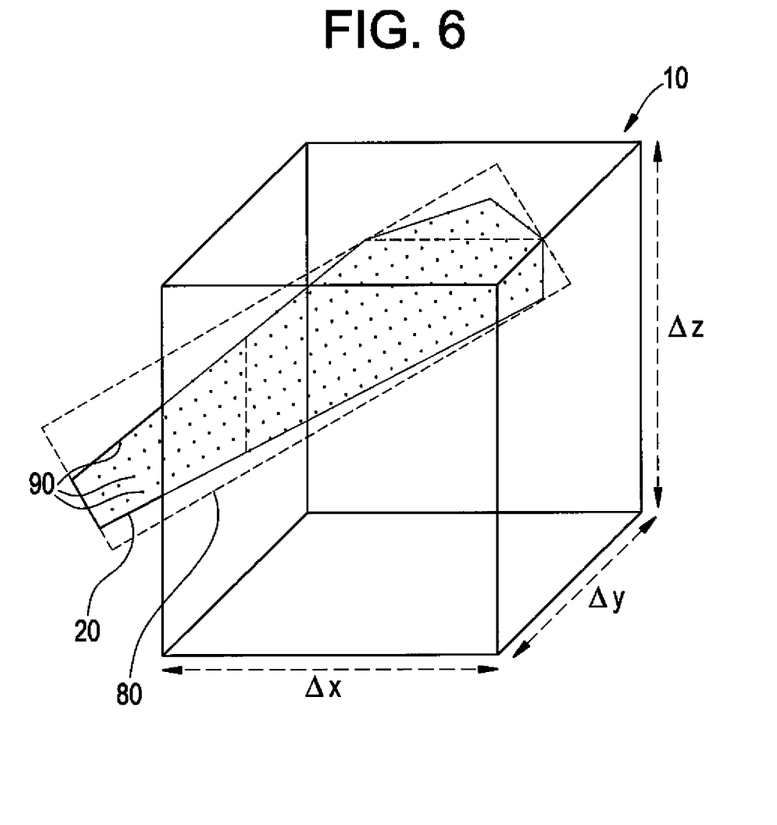
FIG. 6 is a perspective view illustrating mesh points inside the fracture polygon according to an embodiment of the invention.
Figure 7:
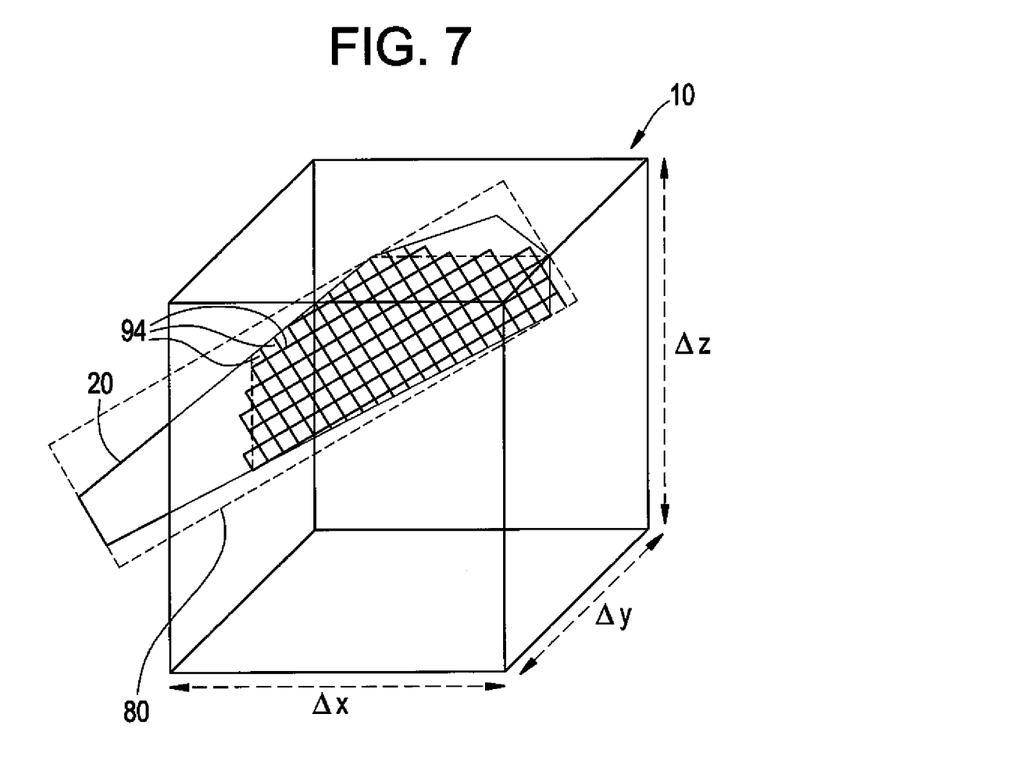
FIG. 7 is a perspective view illustrating the mesh points inside the fracture polygon and inside the voxel according to an embodiment of the invention.

For purposes of efficiently estimating the area of the polygon 20 inside the voxel 10, the goal is to determine the points 84, which are inside the polygon 20 and inside the voxel 10. To perform this determination, an algorithm, such as a winding algorithm, or winding number algorithm, is first used to identify all points 90 inside the polygon 20, as illustrated in FIG. 6. Next, the voxel indices of each mesh point 90 are determined to identify points 94 (see FIG. 7) within the voxel 10. Thus, the points 94 are disposed both within the polygon 20 and voxel 10. The points 94 therefore form a discretized area approximately representing the polygon's fracture area inside the voxel 10. As the product of the length by the width of the minimum bounding rectangle 80 increases, this discretized area approaches the actual fracture area inside the voxel 10.

Figure 3:
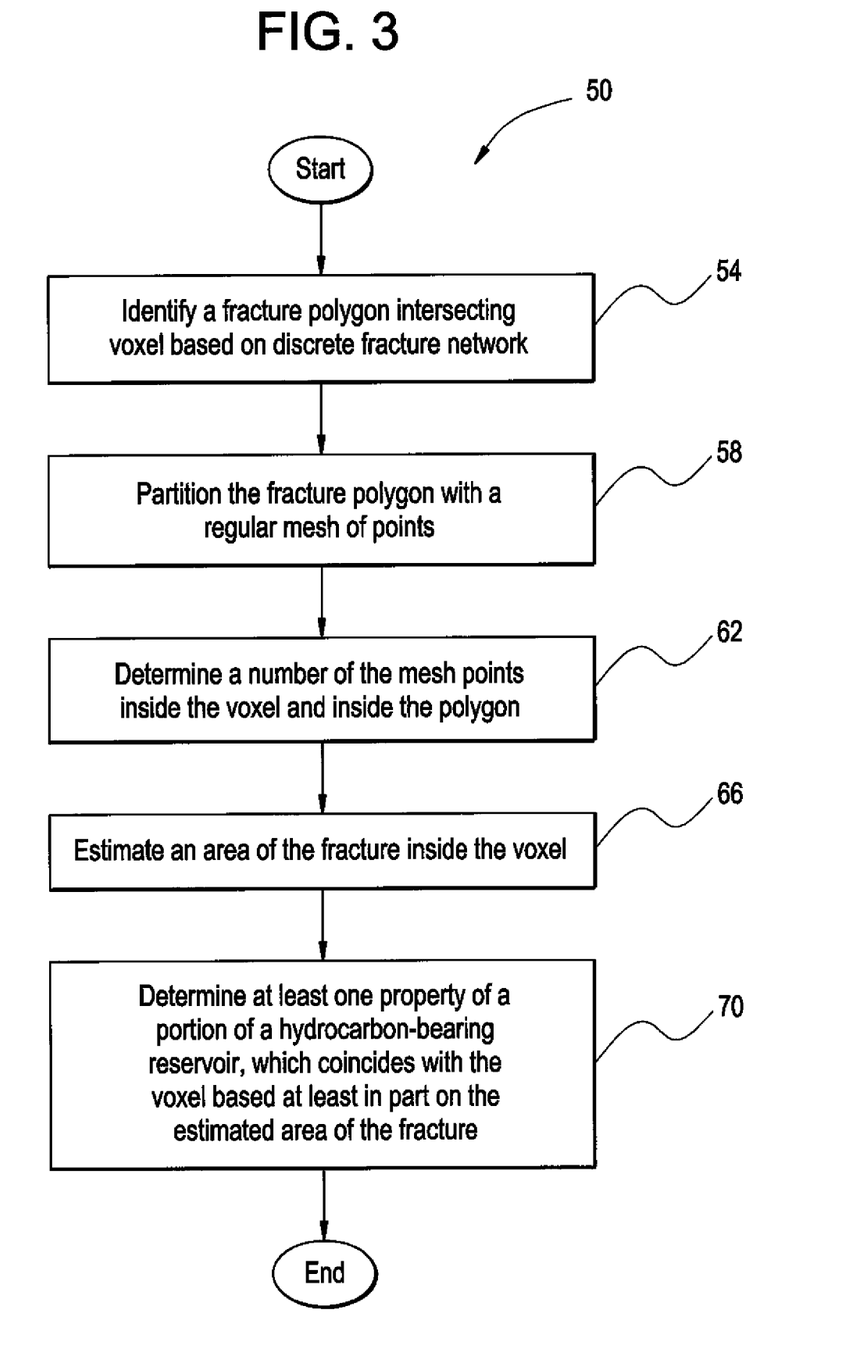
FIG. 3 is a flow diagram depicting a technique that uses a discrete fracture network to determine at least one property of a portion of the reservoir, which coincides with a voxel according to an embodiment of the invention.

To summarize, a technique 50, which is depicted in FIG. 3, may be employed in accordance with embodiments of the invention for purposes of determining a fracture area inside a voxel. Pursuant to the technique 50, a fracture polygon that intersects a voxel of a 3-D grid of voxels is identified (block 54) based on data, which are indicative a DFN. The polygon is then partitioned (block 58) with a regular mesh of points and a determination is made (block 62) regarding a number of the mesh points inside the voxel and inside the polygon. Based at least in part on the determined number of mesh points inside the voxel and inside the polygon, an area of the fracture inside the voxel is estimated, pursuant to block 66. The technique 50 includes determining at least one property of a portion of a reservoir, which corresponds to the voxel based at least in part on the estimated area of the fracture, pursuant to block 70.

Figure 8A:
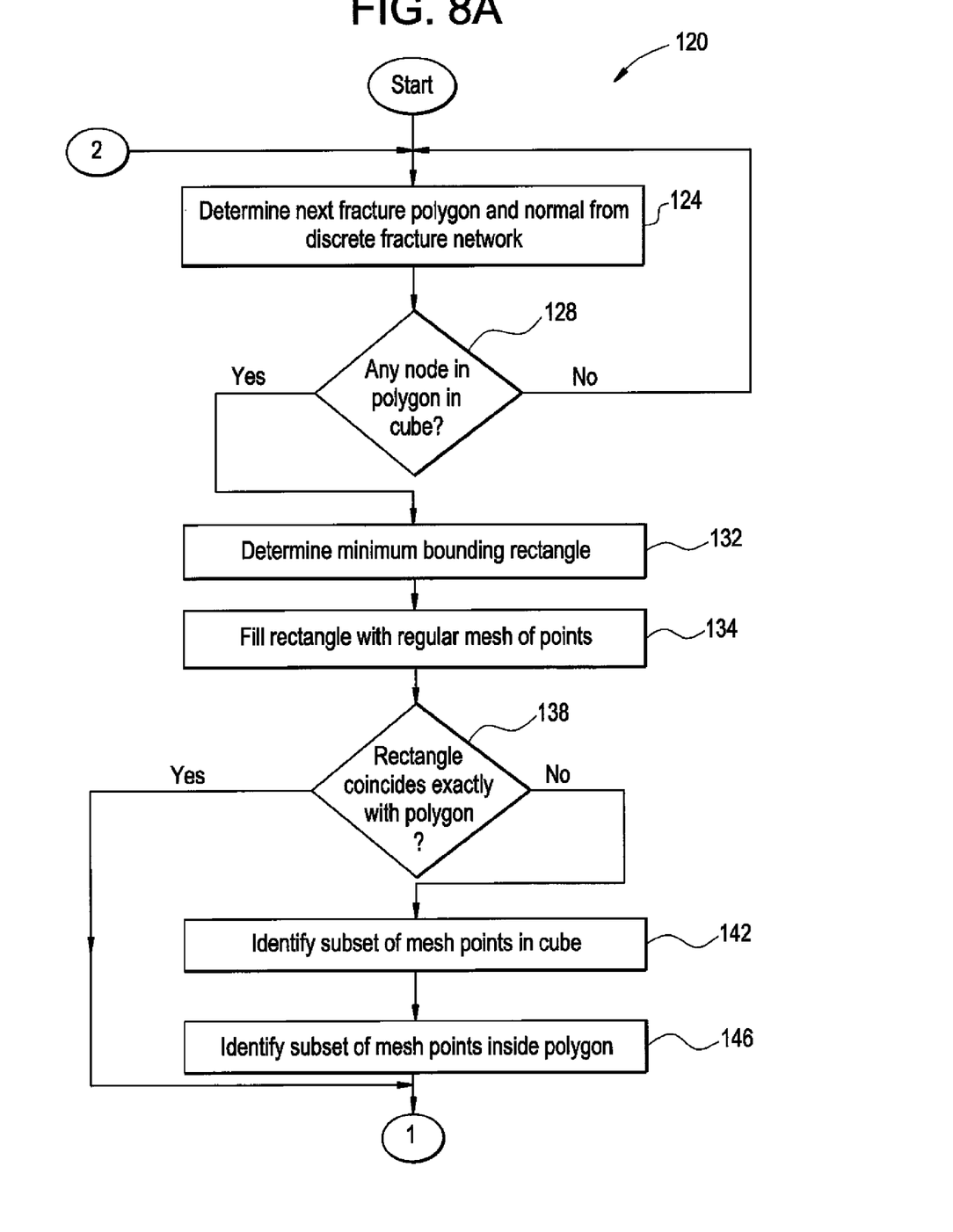
FIGS. 8A and 8B depict a technique that uses a discrete fracture network to determine at least one property of a portion of the reservoir, which coincides with a cube according to an embodiment of the invention.
Figure 8B:
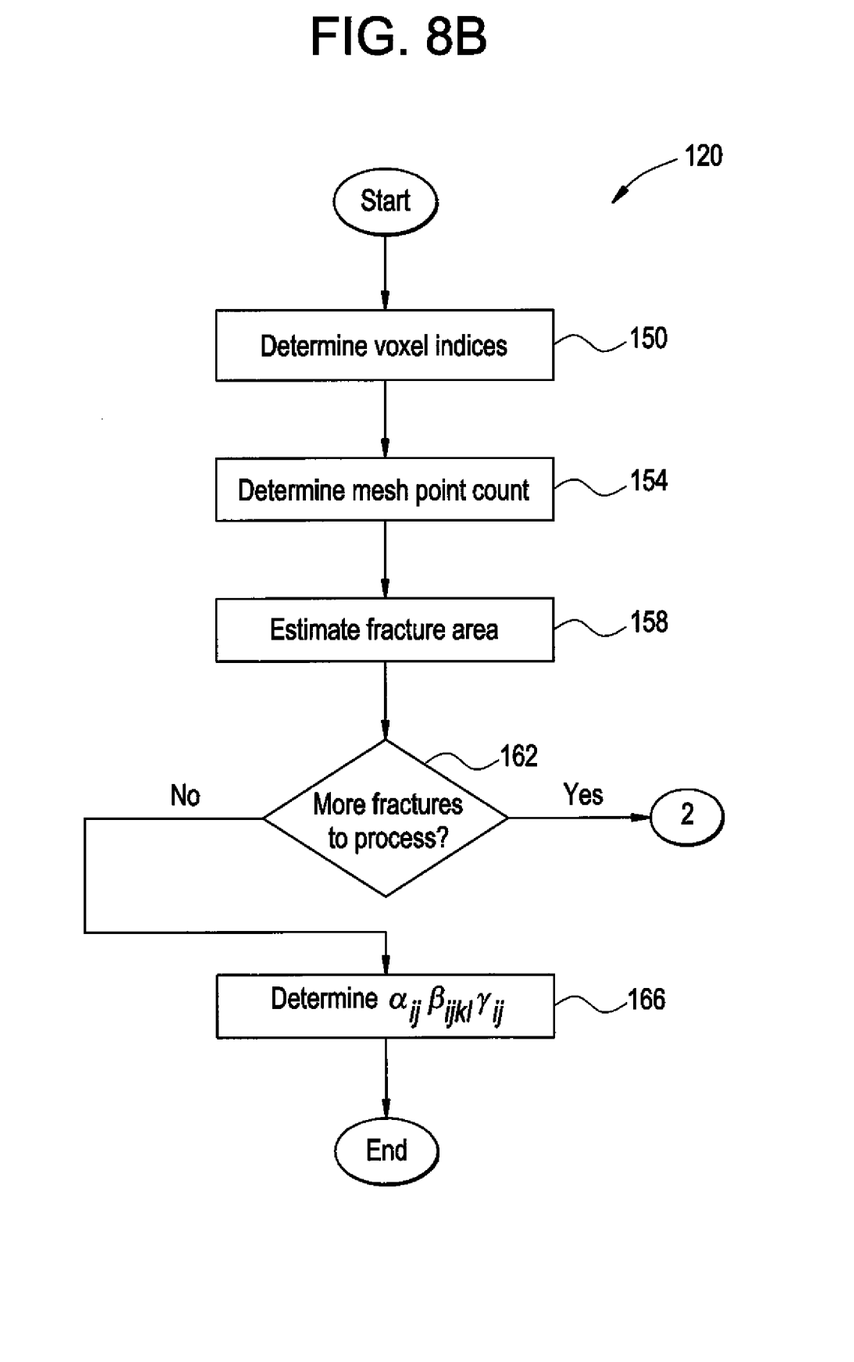

A cell, or cube, of voxels may be concurrently processed for purposes of determining the $\alpha_{ij}$, $\beta_{ijkl}$ and $\gamma_{ij}$ tensors for the cube. In this manner, FIGS. 8A and 8B depict one such technique 120 in accordance with some embodiments of the invention. Pursuant to the technique 120, the next fracture polygon to be processed and its normal are determined from the DFN, pursuant to block 124. If a decision is made (diamond 128) that the fracture polygon is entirely outside of the cube, then control returns to block 124. Otherwise, a minimum bounding rectangle is determined, pursuant to block 132. In this regard, a minimum bounding rectangle of length L and width W is fitted to the fracture polygon.

The bounding rectangle is then filled, pursuant to block 134, with a regular fill mesh of $n_L \times n_W$ points. If a determination is made (diamond 138) that the minimum bounding rectangle does not coincide exactly with the fracture polygon (i.e., the polygon 20 is not a rectangle), then the subset of mesh points inside the polygon (block 142) and the subset of mesh points in the cube (block 146) are identified. Otherwise, control proceeds to block 150 (FIG. 8B), where the voxel indices are determined.

As an example, the voxel indices may be determined, pursuant to Eqs. 9, 10 and 11, which are set forth below:

$$i = INT\left[\frac{(Y - Y_o)\cos(-\theta) - (X - X_o)\sin(-\theta)}{\Delta Y}\right], \quad \text{Eq. 9}$$

$$j = INT\left[\frac{(X - X_o)\cos(-\theta) + (Y - Y_o)\sin(-\theta)}{\Delta X}\right], \text{ and} \quad \text{Eq. 10}$$

$$k = INT\left[\frac{(Z - Z_o)}{\Delta Z}\right], \quad \text{Eq. 11}$$

where "$X_o$," "$Y_o$" and "$Z_o$" represent the coordinates of the cube origin; "X," "Y" and "Z" represent the coordinates of voxel [k,i,j]; "$\Delta X$," "$\Delta Y$" and "$\Delta Z$" represent the uniform grid increments and "$\theta$" represents the rotation angle of the X-Y axis.

After the voxel indices have been determined pursuant to block 150, the technique 120 includes determining a mesh point count, which represents the number of all of the mesh points that are inside the current fracture polygon and cube, pursuant to block 154. Based on these points, the fracture area, which is the area of the currently-processed fracture inside the cube, may then be estimated, pursuant to block 158. More specifically, the fracture area $A^{(r)}$ may be estimated as follows:

$$A^{(r)} = L \cdot W\left[\frac{N[k, i, j] - n_L - n_W + 1}{(n_L - 1)(n_W - 1)}\right] \quad \text{Eq. 12}$$

If any more fractures are to be processed, (diamond 162), then control proceeds back to block 124 to select another fracture polygon and normal (FIG. 8A). Otherwise, all of the $A^{(r)}$ areas have been determined and Eqs. 3, 4 and 5 may be applied to determine the $\alpha_{ij}$, $\beta_{ijkl}$ and $Y_{ij}$ tensors, as described above, pursuant to block 166.

Figure 9:
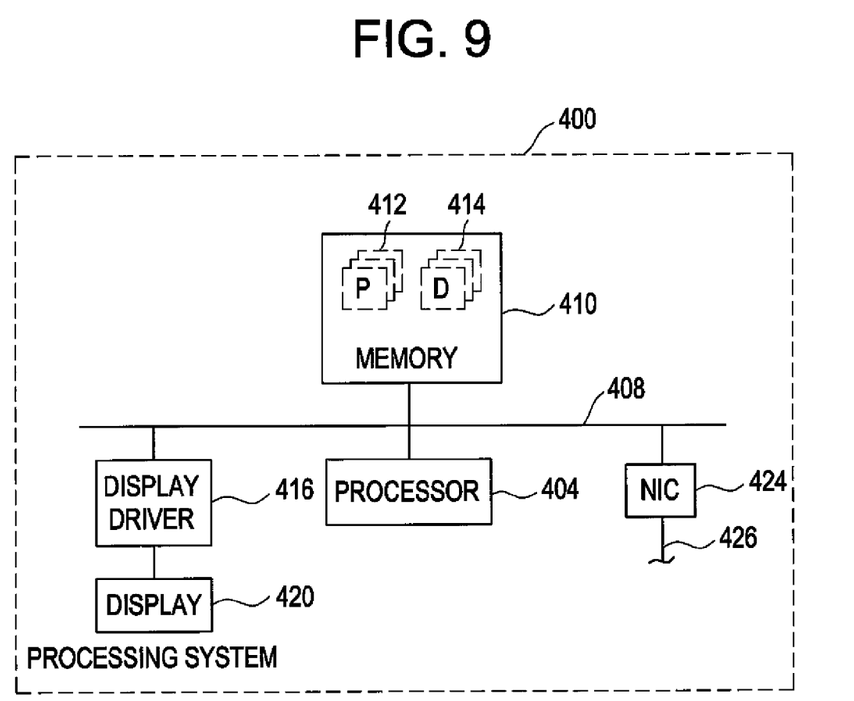
FIG. 9 is a schematic diagram of a processing system according to an embodiment of the invention.

Referring to FIG. 9, in accordance with some embodiments of the invention, a processing system 400 may be used for purposes of efficiently computing the fracture area inside a cube, pursuant to the techniques that are disclosed herein. It is noted that the architecture of the processing system 400 is illustrated merely as an example, as the skilled artisan would recognize many variations and deviations therefrom.

In the example that is depicted in FIG. 9, the processing system 400 includes a processor 404, which executes program instructions 412 that are stored in a system memory 410 for purposes of causing the processor 404 to perform some or all of the techniques that are disclosed herein. As non-limiting examples, the processor 404 may include one or more microprocessors and/or microcontrollers, depending on the particular implementation. In general, the processor 404 may execute program instructions 412 for purposes of causing the processor 404 to determine a fracture area in a cube based on a discrete fracture network, determine mesh points within a polygon, determine a minimum bounding rectangle, determine a regular mesh points inside the rectangle, determine whether mesh points are inside a polygon, inside a cube, inside a voxel, determine elastic and flow properties of portions of a hydrocarbon-bearing reservoir, which corresponds to cubes, etc.

The memory 410 may also store datasets 414 which may be initial, intermediate and/or final datasets produced by the processing by the processor 404. For example, the datasets 414 may include data indicative of a discrete fracture network, as well as data indicative of determined compliance and hydraulic transmissivity tensors.

As depicted in FIG. 9, the processor 404 and memory 410 may be coupled together by at least one bus 408, which may couple other components of the processing system 400 together, such as a network interface card (NIC) 424. As a non-limiting example, the NIC 424 may be coupled to a network 426, for purposes of receiving data indicative of a discrete fracture network, data indicative of programs that cause the processor 404 to perform one or more of the techniques that are disclosed herein, etc. As also depicted in FIG. 9, a display 420 of the processing system 400 may display initial, intermediate or final results produced by the processing system 400. In general, the display 420 may be coupled to the system 400 by a display driver 416. As a non-limiting example, the display 420 may display an image, which graphically depicts the cubes and the tensors, which are determined pursuant to the techniques that are disclosed herein.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   based on data indicative of a discrete fracture network, identifying a fracture polygon intersecting a voxel of a three-dimensional grid of voxels representing a region of interest of a hydrocarbon-bearing reservoir;
   determining a minimum bounding rectangle for the fracture polygon;
   partitioning the minimum bounding rectangle with mesh points, wherein the mesh points comprise a regular mesh of points determined based on a geometry of the minimum bounding rectangle;
   determining a number of the mesh points inside the voxel and inside the fracture polygon;
   based at least in part on the determined number of the mesh points inside the voxel and inside the fracture polygon, estimating an area of the fracture polygon inside the voxel; and
   determining at least one property of a portion of the reservoir, which coincides with the voxel based at least in part on the estimated area of the fracture polygon.

2. The method of claim 1, wherein determining the number of the mesh points inside the voxel and inside the fracture polygon comprises:
   identifying the mesh points within the fracture polygon; and
   determining indices of each mesh point identified within the fracture polygon to identify the mesh points also within the voxel.

3. The method of claim 1, further comprising:
   based on the data, identifying another fracture polygon intersecting the voxel; and
   further basing the act of determining said at least one property on an estimated area of said another fracture polygon inside the voxel.

4. The method of claim 3, further comprising:
   repeating the partitioning, determining a number of mesh points and estimating for said another fracture polygon to determine the estimated area of said another fracture polygon.

5. The method of claim 1, wherein determining said at least one property comprises determining at least an elastic property or a flow property associated with the voxel.

6. The method of claim 1, wherein determining said at least one property comprises determining compliance tensors.

7. The method of claim 1, wherein determining said at least one property comprises determining a permeability tensor.

8. The method of claim 1, wherein determining said at least one property comprises determining a hydraulic transmissivity tensor.

9. A system comprising:
   an interface to receive data indicative of a discrete fracture network;
   a processor; and
   a memory comprising program instructions executable by the processor to:
      identify a fracture polygon intersecting a voxel of a three-dimensional grid of voxels representing a region of interest of a hydrocarbon-bearing reservoir;
      determine a minimum bounding rectangle for the fracture polygon;
      partition the minimum bounding rectangle with mesh points, wherein the mesh points comprise a regular mesh of points determined based on a geometry of the minimum bounding rectangle;
      determine a number of the mesh points inside the voxel and inside the fracture polygon;
      based at least in part on the determined number of the mesh points inside the voxel and inside the fracture polygon, estimate an area of the fracture polygon inside the voxel; and
      determine at least one property of a portion of the hydrocarbon-bearing reservoir, which coincides with the voxel based at least in part on the estimated area of the fracture polygon.

10. The system of claim 9, wherein the program instructions executable by the processor to determine the number of the mesh points inside the voxel and inside the fracture polygon comprise program instructions executable by the processor to:
    identify the mesh points within the fracture polygon; and
    determine indices of each mesh point identified within the fracture polygon to identify the mesh points also within the voxel.

11. The system of claim 9, wherein the memory further comprises program instructions executable by the processor to:
    based on the data, identify another fracture polygon intersecting the voxel; and
    further base the determination of said at least one property on an estimated area of said another fracture polygon inside the voxel.

12. The system of claim 11, wherein the memory further comprises program instructions executable by the processor to:
    repeat the partitioning, determination of a number of mesh points and estimation for said another fracture polygon to determine the estimated area of said another fracture polygon.

13. The system of claim 9, wherein the at least one property comprises an elastic property or a flow property associated with the voxel.

14. The system of claim 9, wherein the at least one property comprises at least one compliance tensor.

15. The system of claim 9, wherein the at least one property comprises a permeability tensor.

16. The system of claim 9, wherein at least one property comprises a hydraulic transmissivity tensor.

17. An article comprising a non-transitory computer readable storage medium to store instructions that when executed by a computer cause the computer to:
    receive data indicative of a discrete fracture network; and
    identify a fracture polygon intersecting a voxel of a three-dimensional grid of voxels representing a region of interest of a hydrocarbon-bearing reservoir;
    determine a minimum bounding rectangle for the fracture polygon;
    partition the minimum bounding rectangle with mesh points, wherein the mesh points comprise a regular mesh of points determined based on a geometry of the minimum bounding rectangle;
    determine a number of the mesh points inside the voxel and inside the fracture polygon;
    based at least in part on the determined number of the mesh points inside the voxel and inside the polygon, estimate an area of the fracture polygon inside the voxel; and
    determine at least one property of a portion of the hydrocarbon-bearing reservoir, which coincides with the voxel based at least in part on the estimated area of the fracture polygon.

18. The article of claim 17, wherein the instructions that when executed by the computer cause the computer to determine the number of the mesh points inside the voxel and inside the polygon further comprise instructions that when executed by the computer cause the computer to:
  identify the mesh points within the fracture polygon; and
  determine indices of each mesh point identified within the fracture polygon to identify the mesh points also within the voxel.

19. The article of claim 17, wherein the storage medium further comprises instructions that when executed by the computer cause the computer to:
  based on the data, identify another fracture polygon intersecting the voxel; and
  further base the determination of said at least one property on an estimated area of said another fracture polygon inside the voxel.

20. The article of claim 19, wherein the storage medium further comprises instructions that when executed by the computer cause the computer to:
  repeat the partitioning, determination a number of mesh points and estimation for said another fracture polygon to determine the estimated area of said another fracture polygon.

21. The article of claim 17, wherein said at least one property comprises an elastic property or a flow property associated with the voxel.

\* \* \* \* \*